(12) United States Patent
Shahparnia et al.

(10) Patent No.: US 12,474,757 B2
(45) Date of Patent: *Nov. 18, 2025

(54) POWER MANAGEMENT SYSTEM FOR ACTIVE STYLUS (71) Applicant: Wacom Co., Ltd., Saitama (JP)

(72) Inventors: Shahrooz Shahparnia, Campbell, CA (US); Trond Jarle Pedersen, Trondheim (NO); John Logan, Danville, CA (US); Vemund Kval Bakken, Menlo Park, CA (US); Kishore Sundara-Rajan, San Jose, CA (US)

(73) Assignee: Wacom Co., Ltd., Saitama (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/753,266

(22) Filed: Jun. 25, 2024

(65) Prior Publication Data

US 2024/0345643 A1 Oct. 17, 2024

Related U.S. Application Data (63) Continuation of application No. 18/349,490, filed on Jul. 10, 2023, now Pat. No. 12,050,499, which is a
(Continued)

(51) Int. Cl.
*G06F 1/3203* (2019.01)
*G06F 3/0354* (2013.01)
*G06F 3/044* (2006.01)

(52) U.S. Cl.
CPC ........ *G06F 1/3203* (2013.01); *G06F 3/03545* (2013.01); *G06F 3/0441* (2019.05); *G06F 3/0442* (2019.05)

(58) Field of Classification Search
None
See application file for complete search history.

(56) References Cited

U.S. PATENT DOCUMENTS

| 4,695,680 | A | 9/1987 | Kable |
| 5,007,085 | A | 4/1991 | Greanias et al. |

(Continued)

FOREIGN PATENT DOCUMENTS

| KR | 20110133297 A | 12/2011 |
| WO | 2012/129247 A2 | 9/2012 |

OTHER PUBLICATIONS

German Office Action, dated May 13, 2024, for German Patent Application No. 102012218167.9.
(Continued)

*Primary Examiner* — Andre L Matthews
(74) *Attorney, Agent, or Firm* — Seed Intellectual Property Law Group LLP (57) ABSTRACT In one embodiment, a stylus includes one or more electrodes and one or more computer-readable non-transitory storage media embodying first logic for transmitting signals wirelessly to a device through a touch-sensor of the device. The stylus has a first power mode in which components of the stylus for receiving signals from or transmitting signals to the device are powered off; a second power mode in which components of the stylus for receiving signals from the device are powered on at least periodically and components of the stylus for transmitting signals to the device are powered off; and a third power mode in which components of the stylus for transmitting signals to the device are powered on at least periodically. The media further embodies second logic for transitioning the stylus from one of the first, second, and third power modes to another one of the first, second, and third power modes.

8 Claims, 8 Drawing Sheets

Related U.S. Application Data continuation of application No. 16/806,780, filed on Mar. 2, 2020, now Pat. No. 11,733,755, which is a continuation of application No. 16/207,903, filed on Dec. 3, 2018, now Pat. No. 10,579,120, which is a continuation of application No. 13/329,270, filed on Dec. 17, 2011, now Pat. No. 10,162,400.

(60) Provisional application No. 61/553,114, filed on Oct. 28, 2011.

(56) References Cited

U.S. PATENT DOCUMENTS

| | | | |
|---|---|---|---|
| 5,889,237 | A | 3/1999 | Makinwa |
| 5,973,677 | A | 10/1999 | Gibbons |
| 7,612,767 | B1 | 11/2009 | Griffin et al. |
| 7,663,607 | B2 | 2/2010 | Hotelling et al. |
| 7,864,503 | B2 | 1/2011 | Chang |
| 7,875,814 | B2 | 1/2011 | Chen et al. |
| 7,920,129 | B2 | 4/2011 | Hotelling et al. |
| 8,031,094 | B2 | 10/2011 | Hotelling et al. |
| 8,031,174 | B2 | 10/2011 | Hamblin et al. |
| 8,040,326 | B2 | 10/2011 | Hotelling et al. |
| 8,049,732 | B2 | 11/2011 | Hotelling et al. |
| 8,179,381 | B2 | 5/2012 | Frey et al. |
| 8,217,902 | B2 | 7/2012 | Chang et al. |
| 2005/0073508 | A1 | 4/2005 | Pittel et al. |
| 2006/0197755 | A1 | 9/2006 | Bawany |
| 2008/0238885 | A1 | 10/2008 | Zachut et al. |
| 2008/0309635 | A1 | 12/2008 | Matsuo |
| 2009/0095540 | A1 | 4/2009 | Zachut et al. |
| 2009/0115725 | A1 | 5/2009 | Shemesh et al. |
| 2009/0127005 | A1 | 5/2009 | Zachut et al. |
| 2009/0153152 | A1 | 6/2009 | Maharyta et al. |
| 2009/0184939 | A1 | 7/2009 | Wohlstadter et al. |
| 2009/0251434 | A1 | 10/2009 | Rimon et al. |
| 2009/0315854 | A1 | 12/2009 | Matsuo |
| 2010/0006350 | A1 | 1/2010 | Elias |
| 2010/0155153 | A1 | 6/2010 | Zachut |
| 2010/0292945 | A1 | 11/2010 | Reynolds et al. |
| 2010/0315384 | A1 | 12/2010 | Hargreaves et al. |
| 2011/0007029 | A1 | 1/2011 | Ben-David |
| 2011/0122087 | A1 | 5/2011 | Jang et al. |
| 2012/0242588 | A1 | 9/2012 | Myers et al. |
| 2012/0242592 | A1 | 9/2012 | Rothkopf et al. |
| 2012/0243151 | A1 | 9/2012 | Lynch |
| 2012/0243719 | A1 | 9/2012 | Franklin et al. |
| 2012/0327040 | A1 | 12/2012 | Simon et al. |
| 2012/0327041 | A1 | 12/2012 | Harley et al. |
| 2012/0331546 | A1 | 12/2012 | Falkenburg et al. |
| 2013/0056243 | A1 | 3/2013 | Kim et al. |

OTHER PUBLICATIONS

Kyung, Ki-Uk et al., "wUbi-Pen : Windows Graphical User Interface Interacting with Haptic Feedback Stylus," *SIGGRAPH,*, Los Angeles, California, Aug. 2008.

Lee, Johnny C. et al., "Haptic Pen: A Tactile Feedback Stylus for Touch Screens," *UIST '04, vol. 6, Issue 2*, Santa Fe, New Mexico, Oct. 2004.

Lynch, "Electronic Devices with Convex Displays," U.S. Appl. No. 61/454,950, filed Mar. 21, 2011, 36 pages.

Myers et al., "Electronic Devices With Concave Displays," U.S. Appl. No. 61/454,936, filed Mar. 21, 2011, 31 pages.

Rothkopf et al., "Electronic Devices With Flexible Displays," U.S. Appl. No. 61/454,894, filed Mar. 21, 2011, 49 pages.

Song, Hyunyoung et al., "Grips and Gestures on a Multi-Touch Pen," *CHI 2011, Session: Flexible Grips & Gestures*, Vancouver, BC, Canada, May 2011.

Tan, Eng Chong et al., "Application of Capacitive Coupling to the Design of an Absolute-Coordinate Pointing Device," *IEEE Transactions on Instrumentation and Measurement*, vol. 54, No. 5, Oct. 2005.

POWER MANAGEMENT SYSTEM FOR ACTIVE STYLUS

CROSS-REFERENCE TO RELATED APPLICATION

This application claims the benefit, under 35 U.S.C. § 119(e), of U.S. patent application Ser. No. 18/349,490, filed Jul. 10, 2023, which is a continuation of U.S. patent application Ser. No. 16/806,780, filed Mar. 2, 2020, now U.S. Pat. No. 11,733,755, issued Aug. 22, 2023, which is a continuation of U.S. patent application Ser. No. 16/207,903, filed Dec. 3, 2018, now U.S. Pat. No. 10,579,120, issued Mar. 3, 2020, which is a continuation of U.S. patent application Ser. No. 13/329,270, filed Dec. 17, 2011, now U.S. Pat. No. 10,162,400, issued Dec. 25, 2018, which claims the benefit of Provisional Patent Application No. 61/553,114, filed Oct. 28, 2011, which is incorporated herein by reference.

BACKGROUND

Technical Field

This disclosure generally relates to active styluses.

Description of the Related Art

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DETAILED DESCRIPTION

Figure 1:
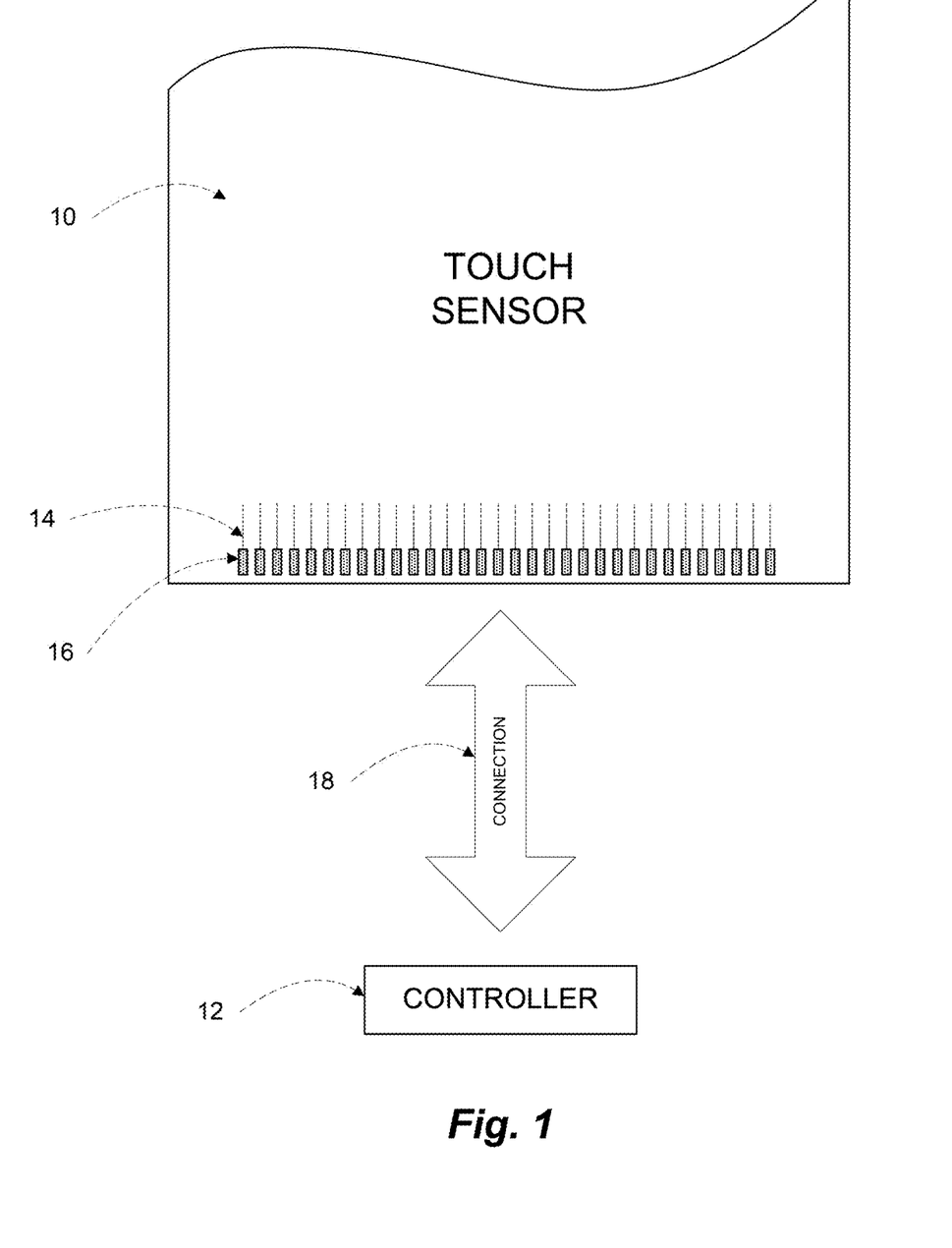
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, guard electrode, drive electrode, or sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as a 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other-instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices (PLDs) or programmable logic arrays (PLAs), application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor and provide measurement signals to the processor unit representing capacitances at the capacitive nodes. The processor unit may control the supply of drive signals to the drive 10 electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g., at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
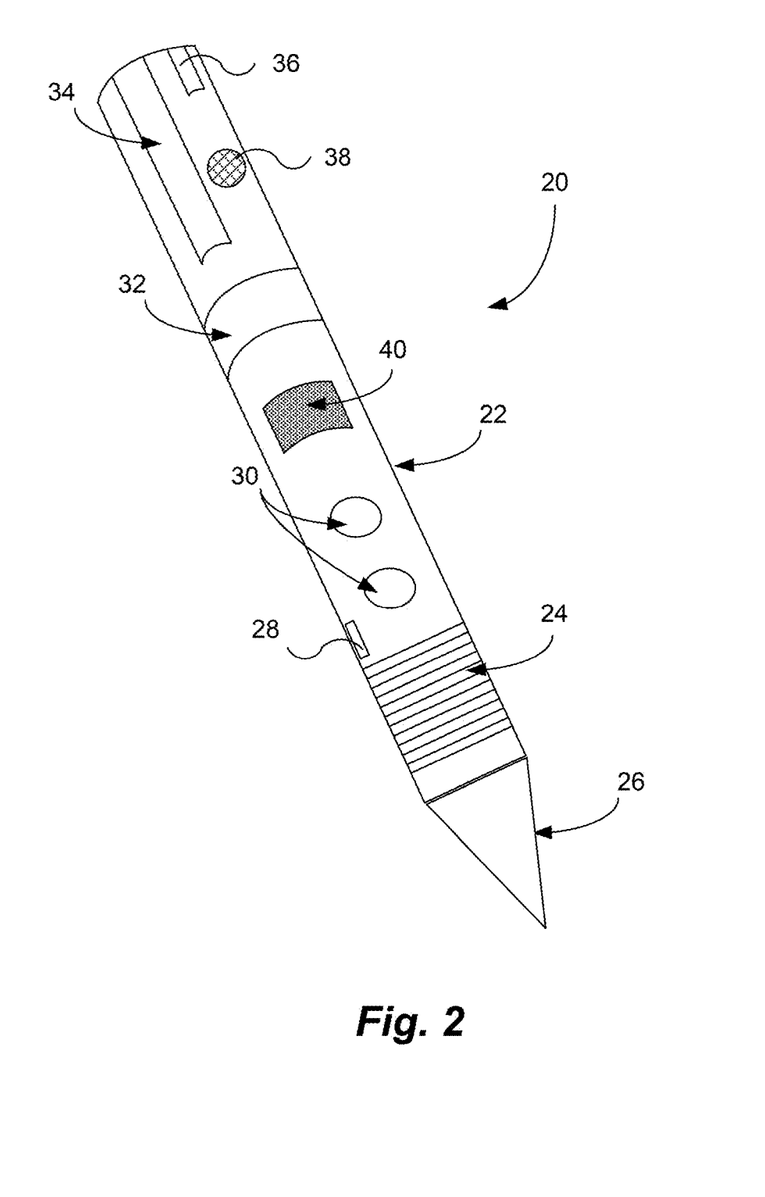
FIG. 2 illustrates an example active stylus exterior.

FIG. 2 illustrates an example exterior of an example active stylus 20. Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g., 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis, while one or more wheel sliders 32 may be aligned along the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator. As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses.

Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
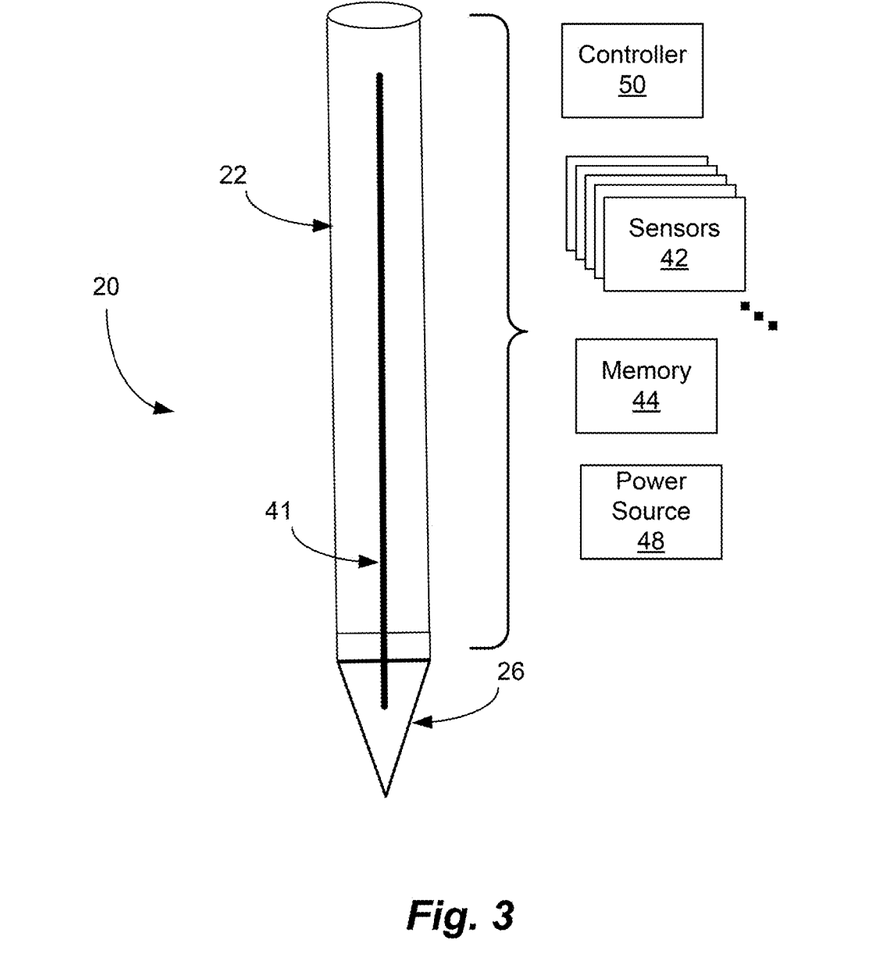
FIG. 3 illustrates an example active stylus interior.

FIG. 3 illustrates an example internal components of example active stylus 20. Active stylus 20 may include one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device. As an example and not by way of limitation, power may be inductively transferred between power source 48 and a power source of the device.

Figure 4:
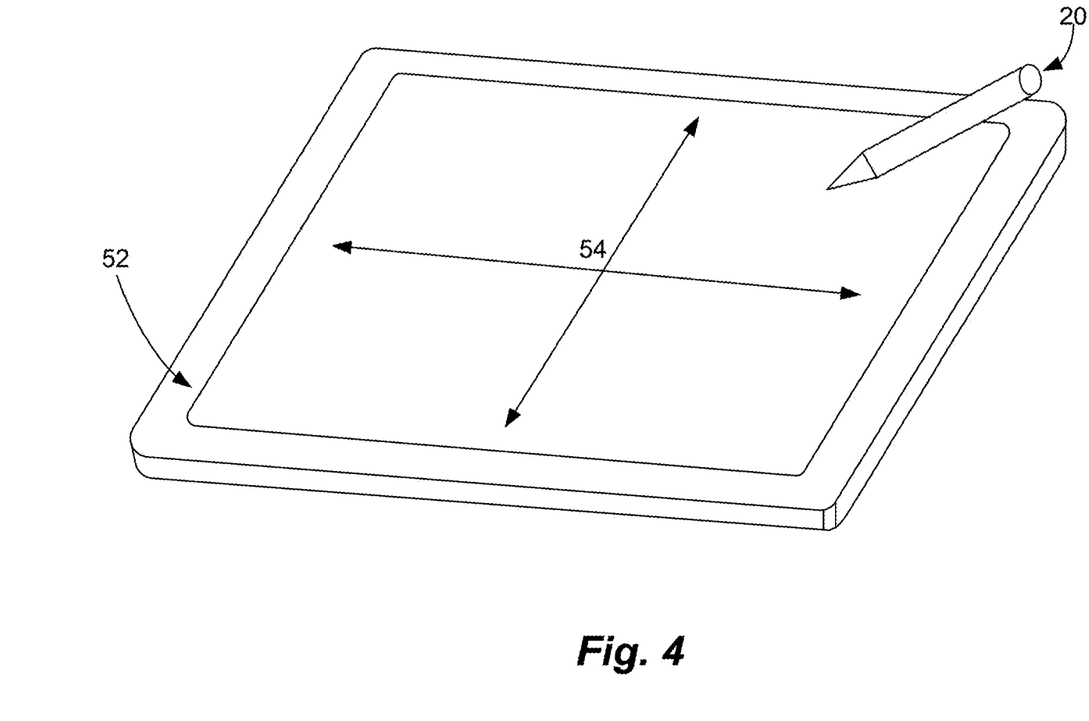
FIG. 4 illustrates an example active stylus with touch sensor device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Figure 5:
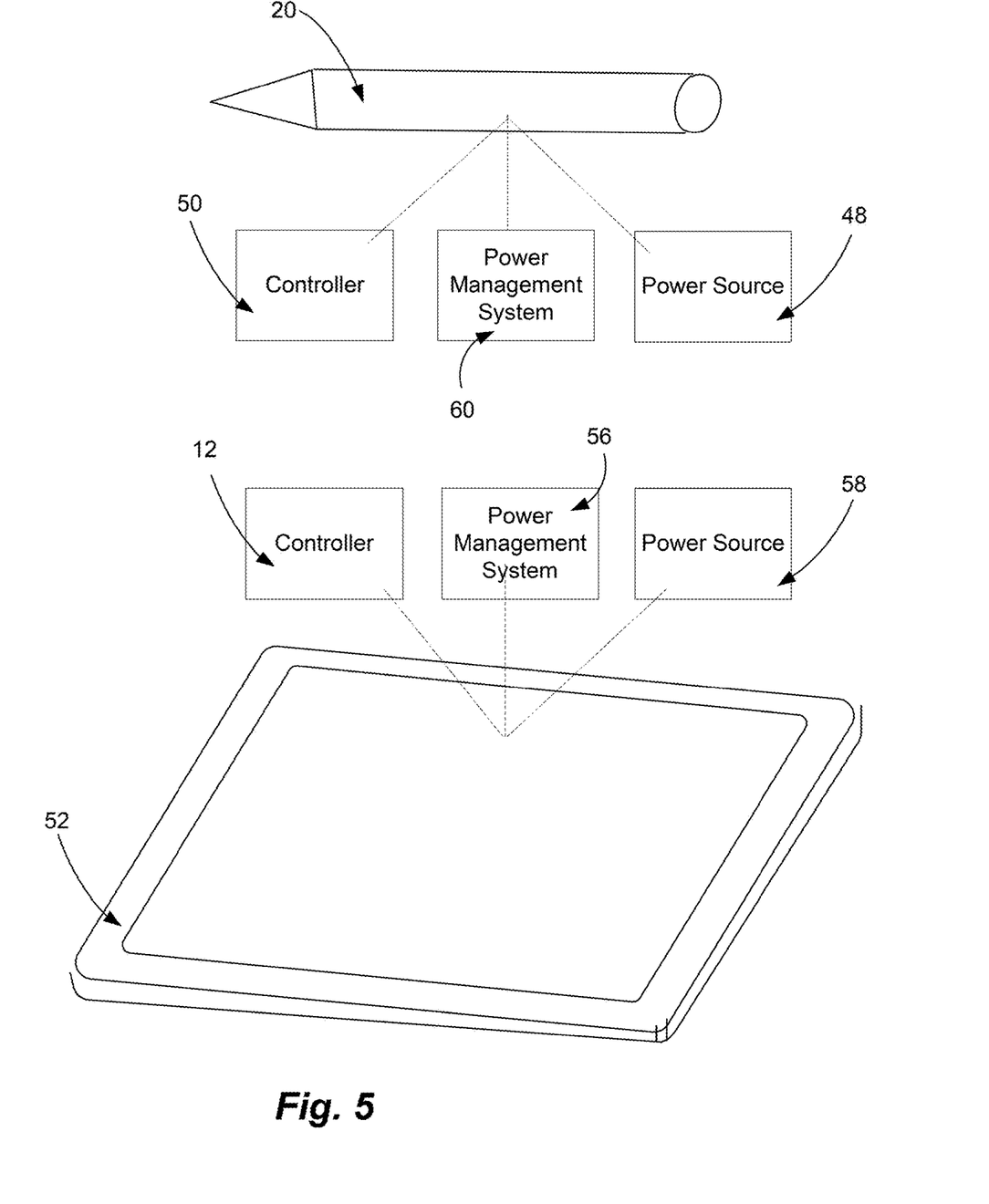
FIG. 5 illustrates example power management systems and power sources for an active stylus and touch-sensitive device.

FIG. 5 illustrates example power management systems and power sources for a touch sensor system. Power management systems and power sources may be associated with components of the touch-sensor system, such as active styluses, touch-sensitive devices, and the components associated with active styluses and touch-sensitive devices. Active stylus 20 may have one or more power sources 48. Likewise, touch-sensitive device 52 may have one or more power sources 58. Power sources 48 and 58 may communicate with controllers 50 and 12, respectively. In particular embodiments, the communication is controlled or monitored by one or more graphical user interfaces operating on any suitable active stylus or device. Power sources 48 and 58 may store, receive, transmit, or produce electromagnetic energy suitable for use by a touch sensor system or associated components. In particular embodiments, electromagnetic energy is received or transmitted by any suitable method such as wiring, direct physical contact, induction, temperature gradients, piezoelectric materials, mechanical methods, electromagnetic radiation, or any suitable combination thereof. Power sources 48 and 58 may include any suitable component that delivers, receives, produces, or modifies energy, such as a transformer. Power sources 48 and 58 may convert any kind of electromagnetic energy stored, produced, received, or transmitted to any other kind of electromagnetic energy suitable for use by a touch sensor system and its associated components. Electromagnetic energy may be in any suitable form, such as electric fields, magnetic fields, static configurations of electric charge, and electric currents.

Power source 48 may be external or internal to active stylus 20, and power source 58 may be external or internal to touch-sensitive device 52. In particular embodiments, an internal power source is a battery or a capacitor. In particular embodiments, an external power source is a wall outlet or another device, such as a computer. A power source internal to one active stylus or device may be external to another active stylus or device. As an example of a particular embodiment, power source 58 is internal to touch-sensitive device 52, while also serving as an external power source 48 for active stylus 20. While this disclosure describes specific examples of particular embodiments of power sources 48 and 58, this disclosure contemplates any suitable power sources 48 and 58 delivering, receiving, storing or producing any suitable kind of electromagnetic energy by any suitable method to or from any suitable sources or destinations.

Active stylus 20 may have one or more power management systems 60. Likewise, touch-sensitive device 52 may have one or more power management systems 56. Power management systems 60 and 56 may communicate with controllers 50 and 12, respectively. In particular embodiments, the communication is controlled or monitored by a graphical user interface operating on an active stylus or device. Power management systems 60 and 56 may control, modify, or record the receipt, production, or transfer of electromagnetic energy suitable for use by a touch sensor system or its associated components. In particular embodiments, power management systems 60 and 56 allocate to one or more components associated with a touch sensor system electromagnetic energy existing on or incoming to one or more components associated with the touch sensor system. In particular embodiments, power management systems 60 and 56 use criteria, such as metrics, to initiate, allocate, and terminate the allocation of energy between one or more components of a touch sensor system. In particular embodiments, power management systems 60 and 56 allocate a particular amount of power to one or more components associated with a touch sensor system, and are capable of allocating different amounts of power to particular components at different times. As an example, a power management system 60 determines power modes of an active stylus. A power mode describes the amount of power sent to one or more components associated with an active stylus. The power management system 60 may transition the active stylus between power modes based at least in part on input from a user or an active stylus or device. A graphical user interface may allow a user to control or monitor the power modes of an active stylus and the method or criteria used to transition between them.

Figure 6:
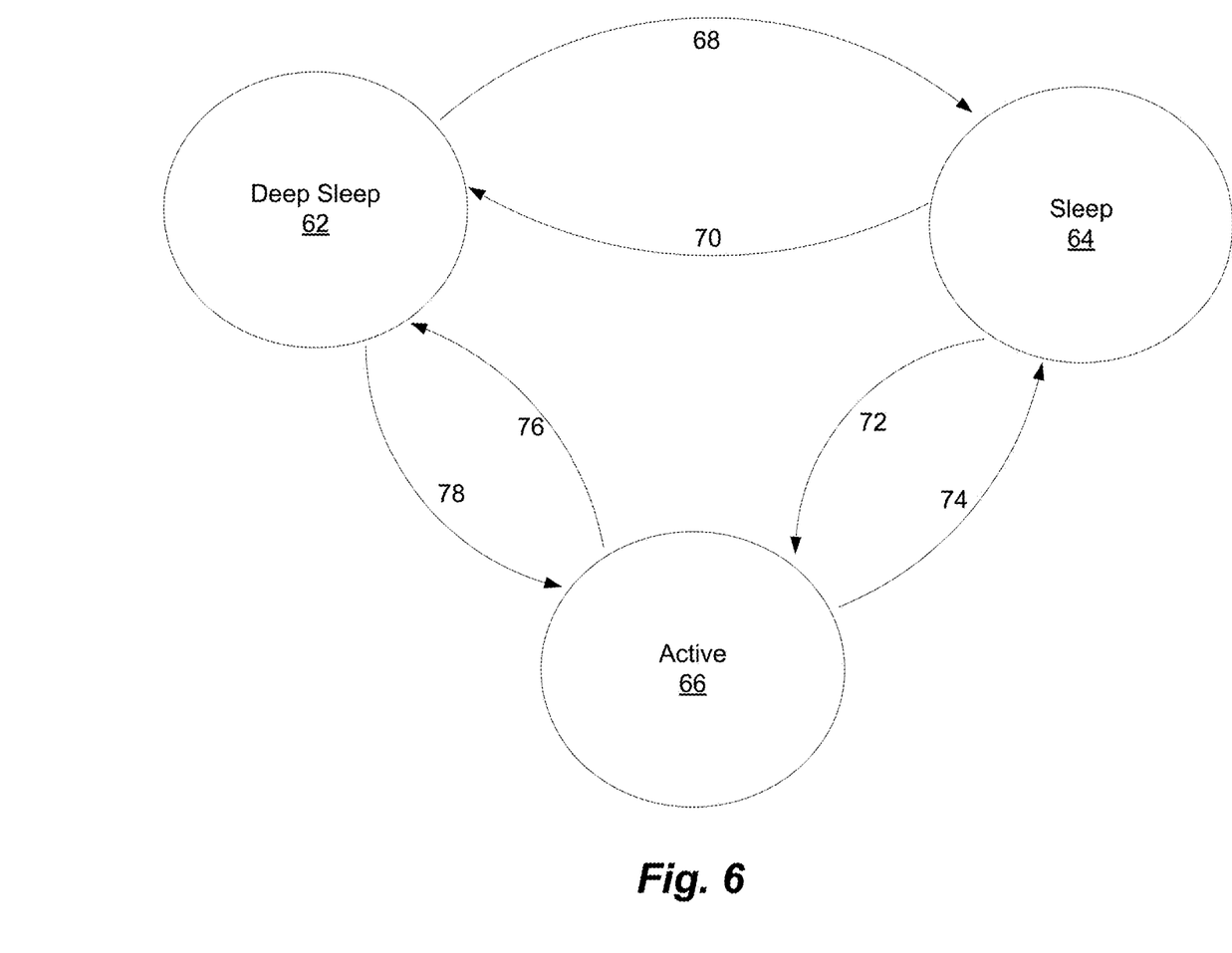
FIG. 6 illustrates an example set of power modes for an active stylus and the methods of transitioning between them.

FIG. 6 illustrates a particular embodiment of power modes for an active stylus and the methods of transitioning between them. In this example, an active stylus has three power modes: deep sleep 62, sleep 64, and active 66. While this disclosure provide specific examples of particular embodiments illustrating the number of power modes, specific components powered in a particular way in a power mode, and the methods of switching between power modes, this disclosure contemplates any suitable number of power modes powering any suitable components in any suitable way. This disclosure further contemplates transitioning between any two power modes in any suitable way.

In power mode deep sleep 62, a substantial number of components receive no power or operate in low power modes. As an example, a receiver that receives signals from a touch-sensitive device and a transmitter that transmits signals to a touch-sensitive device are powered off when the active stylus is in deep sleep 62, a MCU operates in a low-power state, and one or more sensors are off or operating in a low-power state. While this disclosure contemplates particular examples of power mode deep sleep 62, this disclosure contemplates any suitable components powered in any suitable way in deep sleep 62.

In power mode sleep 64, some components receive no power or low power as in deep sleep 62 while at least one component is receiving more power than in deep sleep 62. As an example, an MCU receives 10 to 30 times more power in sleep 64 than in deep sleep 62. As another example, a receiver is powered on at least periodically while a transmitter is powered off. As another example, one or more sensors are powered on in sleep 64 that were powered off in deep sleep 62. While this disclosure contemplates particular examples of power mode sleep 64, this disclosure contemplates any suitable components powered in any suitable way in sleep 64.

One or more components that are powered off or in a low-power state in sleep 64 are powered on or in a full-power state in power mode active 66. As an example, a receiver and a transmitter are powered on at least periodically, and an MCU operates in full-power mode. As another example, one or more sensors are powered on in active 66 that were powered off in sleep 64. While this disclosure contemplates particular embodiments of power mode active 66, this disclosure contemplates any suitable components powered in any suitable way in active 66.

In particular embodiments, a power management system may transition between any two power modes based on any suitable criteria, such as input from a user, detection or loss of a signal, or communication between the active stylus and a device, such as a computer or touch-sensitive device. As an example, an active stylus transitions 68 from deep sleep 62 to sleep 64 when a user operates a button or switch or places pressure in a specific way on the active stylus. As another example, an active stylus transitions 70 from sleep 64 to deep sleep 62 when the receiver in the active stylus does not detect one or more signals from a touch-sensitive device for a predetermined amount of time. As another example, an active stylus transitions 72 from sleep 64 to active 66 when the active stylus detects the presence of a touch-sensitive device or particular functionality demanded by a user, such as a gesture performed by the active stylus. As another example, an active stylus transitions 74 from active 66 to sleep 64 when the active stylus does not communicate with a touch-sensitive device for a predetermined period of time. As another example, an active stylus transitions 76 from active 66 to deep sleep 62 when a user operates a switch or tethers the active stylus to a touch-sensitive device. As another example, an active stylus transitions 78 from deep sleep 62 to active 66 when a user performs a particular gesture associated with the transition, such as shaking the active stylus. The functionality associated with a particular button push, switch operation, gesture performed, signal detected or lost, and predetermined amount of time may be set by a user, an active stylus, or a touch-sensitive device, and may be different in different power modes. While this disclosure describes specific examples of particular embodiments of transitions between any two power modes, this disclosure contemplates an active stylus switching between any two power modes based on any suitable method or criteria.

Figure 7:
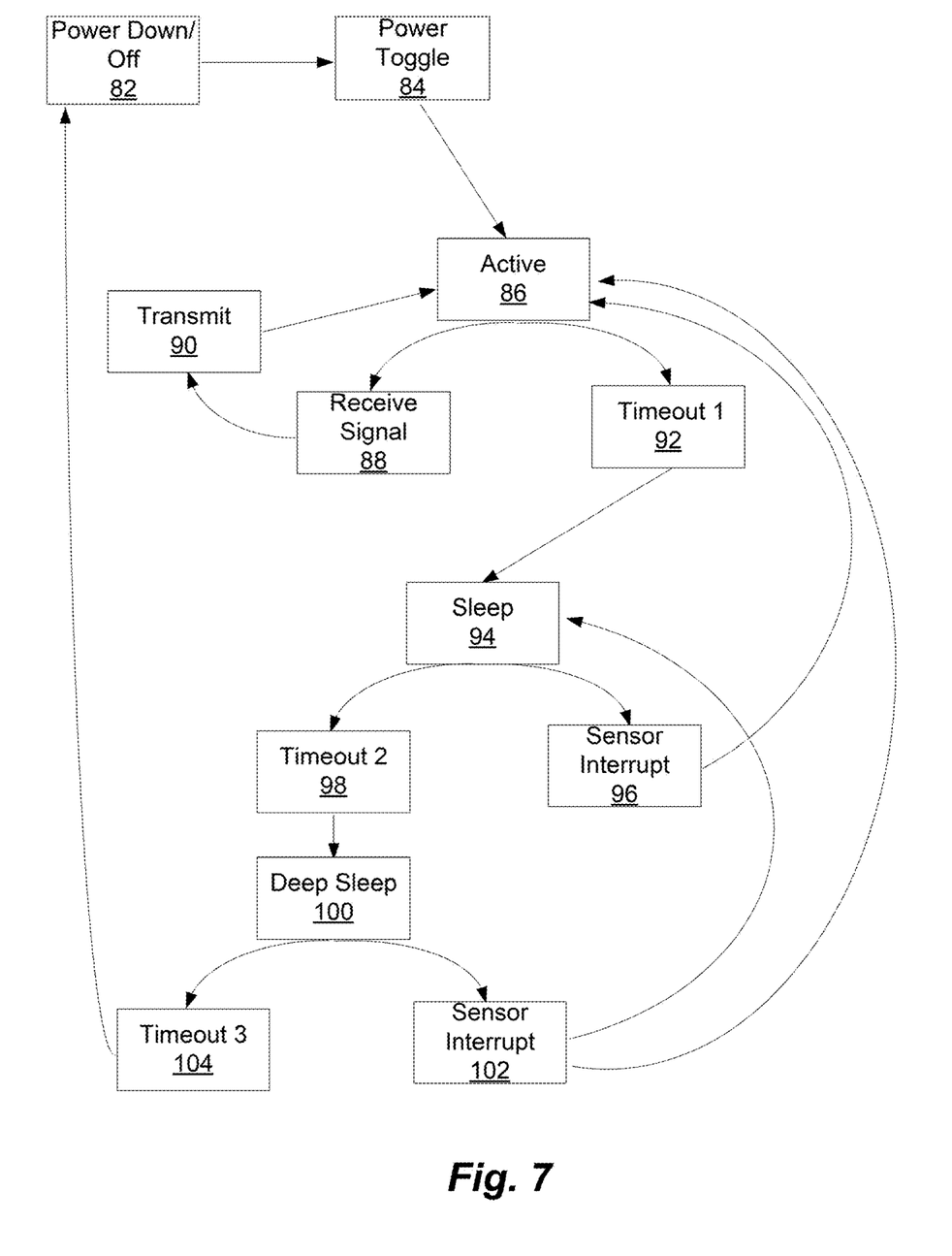
FIG. 7 illustrates an example method for powering an active stylus in a variety of power modes.

FIG. 7 illustrates an example method for powering an active stylus in a variety of power modes. The method may begin at step 82, in which the active stylus is powered off. Power toggle 84, such as a button press, puts the stylus in active mode 86, which powers a receiver, a transmitter, one or more sensors, and a high-voltage pump and puts the MCU in full-power mode, in which the MCU is ready to transmit signals. One or more sensors communicate with the MCU. At step 88, the MCU may receive an incoming signal, store it, and alter it. The MCU may transmit the received signal to the active stylus tip at step 90. While in active mode 86, if no signal is received for a first predetermined amount of time set by a user, active stylus, or device, timeout 92 occurs, which puts the stylus in sleep mode 94 by powering down the transmitter, putting the MCU in a low-power mode, putting one or more sensors in interrupt-only mode, and powering off any high-voltage components of the active stylus. If a signal from one or more sensors interrupts 96 sleep mode 94, the active stylus returns to active mode 86. If no signal is received for a second predetermined amount of time set by a user, active stylus, or device, timeout 98 occurs, placing the stylus in deep sleep mode 100 by powering the receiver and transmitter off and putting the MCU to sleep. Deep sleep 100 may be interrupted 102 by signals from one or more sensors, putting the stylus in sleep mode 94 or active mode 86. If deep sleep 100 is not interrupted by one or more sensors for a third predetermined amount of time set by a user, active stylus, or device timeout 104 occurs, powering the active stylus off. Particular embodiments may repeat the steps of the method of FIG. 7, where appropriate. Moreover, although this disclosure describes and illustrates particular steps of the method of FIG. 7 as occurring in a particular order, this disclosure contemplates any suitable steps of the method of FIG. 7 occurring in any suitable order. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
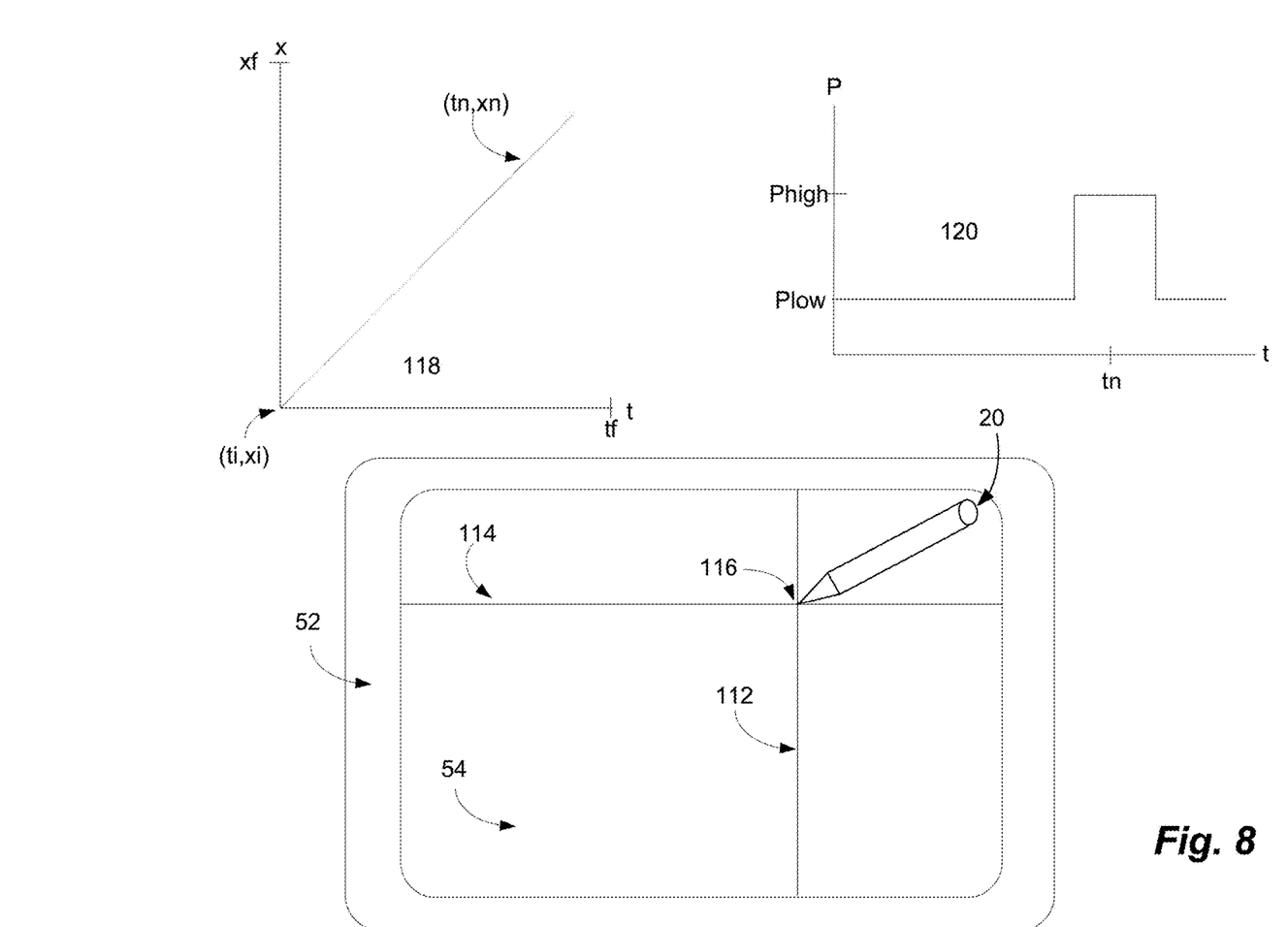
FIG. 8 illustrates an example of duty cycling a component in a particular power mode.

In particular embodiments, in any power mode in which a component is powered on a power management system may power the component on for only a certain period of time. As an example, a power management system duty cycles one or more components in one or more power modes. FIG. 8 illustrates an example of duty cycling a transmitter that transmits signals from active stylus 20 to touch-sensitive device 52.

Touch sensitive area 54 contains drive lines 112 and sense lines 114. Touch-sensitive device 52 may periodically scan sense lines 114 or drive lines 112. For example, touch-sensitive device 52 may periodically provide increased voltage to drive lines 112. Graph 118 illustrates an example method touch-sensitive device 52 may use to scan drive lines 112. Touch-sensitive device 52 begins scanning drive line xi at time ti and proceeds to scan drive lines linearly as a function of time, scanning drive line xn at time tn. Touch-sensitive device 52 scans the last drive line xf at time tf, at which point it may repeat the process, starting once again at drive line xi. While this disclosure describes a specific example of a particular embodiment used to periodically scan drive lines 112, this disclosure contemplates scanning drive lines 112 in any suitable method in any suitable timeframe.

Graph 120 illustrates an example duty cycling of a transmitter of active stylus 20. At point 116, active stylus 20 is in the immediate proximity of drive line xn, which is being scanned by touch-sensitive device 52 at time tn as illustrated in graph 118. Active stylus 20 supplies the transmitter with power Phigh during a window of time around tn. The window of time may account for possible motion of active stylus 20. Outside of this window of time, active stylus 20 supplies the transmitter with power Plow, for example powering the transmitter off. In particular embodiments, active stylus 20 may dynamically learn the method and timing touch-sensitive device 52 uses to scan drive lines 112. As an example, active stylus 20 initially supplies the transmitter with power Phigh continuously and, as active stylus 20 learns the method and timing touch-sensitive device 52 uses to scan drive lines, the window of time that the transmitter receives power Phigh is decreased to a suitable duration. As another example of a particular embodiment of duty cycling, active stylus 20 periodically powers for a suitable duration a receiver that receives signals from drive lines 112 of touch-sensitive device 52. While this disclosure describes specific examples of a specific component being duty cycled between particular power levels in a particular way during a particular window of time, this disclosure contemplates any suitable component being duty cycled between any suitable power levels in suitable way for any suitable period of time.

Herein, reference to a computer-readable non-transitory storage medium includes a semiconductor-based or other integrated circuit (IC) (such, as for example, a field-programmable gate array (FPGA) or an application-specific IC (ASIC)), a hard disk (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method implemented by an integrated circuit, the method comprising:
controlling a stylus to operate in:
a first power mode in which components of the stylus for receiving signals from a sensor device are powered off and components of the stylus for transmitting signals to the sensor device are powered off;
a second power mode in which the components of the stylus for receiving drive signals transmitted wirelessly from the sensor device and used by the stylus to detect the sensor device are periodically switched between a powered on state and a powered off state at a first duty cycle and the components of the stylus for transmitting signals to the sensor device are powered off; or
a third power mode in which the components of the stylus for receiving the drive signals transmitted wirelessly from the sensor device are powered on at a second duty cycle that is higher than the first duty cycle and the components of the stylus for transmitting stylus signals to the sensor device are powered on to transmit the stylus signals; and
in response to detecting the drive signals transmitted wirelessly from the sensor device, transitioning the stylus from the second mode to the third mode.

2. The method of claim 1, comprising:
synchronizing the stylus with the sensor device using a pre-determined bit sequence included in the drive signals transmitted wirelessly from the sensor device.

3. The method of claim 1, comprising:
transitioning the stylus from one of the first, second, and third power modes to another one of the first, second, and third power modes based at least in part on an input from a user of the stylus.

4. The method of claim 3, wherein the input is a gesture performed with the stylus.

5. The method of claim 1, comprising:
transitioning the stylus from one of the first, second, and third power modes to another one of the first, second, and third power modes based at least in part on detection of, or loss of, a signal generated by the sensor device.

6. The method of claim 1, wherein, in the third power mode, the components of the stylus for transmitting stylus signals to the sensor device are powered on during windows of time when a touch sensor of the sensor device is scanned.

7. The method of claim 6, wherein, in the third power mode, periods of time during which the components of the stylus for transmitting stylus signals to the sensor device are powered on are decreased to correspond to the windows of time when the touch sensor of the sensor device is scanned.

8. The method of claim 7, wherein, in the third power mode, the periods of time are set to account for movement of the stylus relative to the sensor device.

* * * * *